(12) United States Patent
Keiser et al.

(10) Patent No.: US 10,654,753 B2
(45) Date of Patent: May 19, 2020

(54) GYPSUM ADDITIVE TO CONTROL MERCURY

(71) Applicant: ECOLAB USA INC., St. Paul, MN (US)

(72) Inventors: Bruce A. Keiser, Plainfield, IL (US); Wayne M. Carlson, Batavia, IL (US); Nicholas R. Denny, Glen Ellyn, IL (US); Jianwei Yuan, Aurora, IL (US); Tommy Hung-Ting Chen, Aurora, IL (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 16/289,379

(22) PCT Filed: Aug. 7, 2017

(86) PCT No.: PCT/US2017/045689
§ 371 (c)(1),
(2) Date: Feb. 28, 2019

(87) PCT Pub. No.: WO2018/044508
PCT Pub. Date: Mar. 8, 2018

(65) Prior Publication Data
US 2019/0300429 A1    Oct. 3, 2019

Related U.S. Application Data

(60) Provisional application No. 62/382,660, filed on Sep. 1, 2016.

(51) Int. Cl.
| | | |
|---|---|---|
| *C04B 24/12* | (2006.01) | |
| *C04B 11/024* | (2006.01) | |
| *C04B 11/00* | (2006.01) | |
| *C04B 24/26* | (2006.01) | |
| *C04B 24/14* | (2006.01) | |
| *C04B 24/38* | (2006.01) | |

(52) U.S. Cl.
CPC .......... *C04B 24/121* (2013.01); *C04B 11/007* (2013.01); *C04B 11/024* (2013.01); *C04B 24/14* (2013.01); *C04B 24/2641* (2013.01); *C04B 24/2652* (2013.01); *C04B 24/38* (2013.01)

(58) Field of Classification Search
CPC .... C01F 11/46; C01F 11/464; B01D 53/1481; B01D 53/501; B01D 53/64; B01D 2251/404; B01D 2252/60; B01D 2252/602; B01D 2257/302; B01D 2257/602; B01D 2258/0283
See application file for complete search history.

(56) References Cited

U.S. PATENT DOCUMENTS

| | | | |
|---|---|---|---|
| 4,081,522 A * | 3/1978 | Hubble | B01D 53/501 423/170 |
| 7,507,287 B1 | 3/2009 | Luan | |
| 7,771,700 B2 * | 8/2010 | Mauldin | B01D 53/64 423/566.3 |
| 8,110,163 B2 | 2/2012 | Keiser et al. | |
| 8,211,389 B2 | 7/2012 | Zinn et al. | |
| 8,632,742 B2 | 1/2014 | Keiser et al. | |
| 8,747,789 B2 | 6/2014 | Zinn et al. | |
| 8,845,991 B2 | 9/2014 | Keiser et al. | |
| 8,927,637 B2 | 1/2015 | Zinn et al. | |
| 8,932,549 B2 | 1/2015 | Ergang et al. | |
| 9,023,302 B2 | 5/2015 | Keiser et al. | |
| 2009/0145343 A1 * | 6/2009 | Mauldin | B01D 53/64 110/216 |
| 2013/0180923 A1 | 7/2013 | Keiser | |

FOREIGN PATENT DOCUMENTS

| | | | |
|---|---|---|---|
| CN | 103394282 | 11/2013 | |
| CN | 103736387 | 4/2014 | |
| JP | 11079741 A * | 3/1999 | .............. C01F 11/46 |
| JP | 2009161415 | 7/2009 | |
| WO | WO 2009/052362 A2 | 4/2009 | |
| WO | WO 2009/061675 | 5/2009 | |

OTHER PUBLICATIONS

International Search Report and Written Opinion for PCTUS17/045689, dated Nov. 14, 2017, 12 pages.
Cheng, Chin-Min et al., "Mercury emission and plant uptake of trace elements during early stage of soil amendment using flue gas desulfurization materials" Journal of the Air & Waste Management Association (2012) 62(2): 139-150.
Cheng, Chin-Min et al., "Emission and Leaching Potential of Mercury From Flue Gas Desulfurization (FGD) Byproducts Amended Soil" World of Coal Ash (WOCA) Conference (2009) 139/1-139/7.
Chimenos, J. M. et al., "Optimizing the APC residue washing process to minimize the release of chloride and heavy metals" Waste Management (2005) 25(7): 686-693.
Golightly, Donald W. et al., "Fly Ash Properties and Mercury Sorbent Affect Mercury Release from Curing Concrete" Energy & Fuels (2009) 23: 2035-2040.
Golightly, Donald W. et al., "Gaseous Mercury Release during Steam Curing of Aerated Concretes That Contain Fly Ash and Activated Carbon Sorbent" Energy & Fuels (2008) 22: 3089-3095.
Gustin, Mae et al., "Laboratory Investigation of Hg Release from Flue Gas Desulfurization Products" Environmental Science & Technology (2010) 44(10): 4012-4018.
Heebink, Loreal V. et al., "Mercury release from FGD" Fuel (2005) 84(11): 1372-1377.

(Continued)

*Primary Examiner* — Timothy C Vanoy
(74) *Attorney, Agent, or Firm* — Eric D. Babych; Barnes & Thornburg LLP

(57) ABSTRACT

Additives including sulfur-containing compounds are used in methods of treating synthetic gypsum. The additives can thermally stabilize heavy metals, such as mercury. This thermal stabilization reduces mercury release from the synthetic gypsum. Illustrative, non-limiting examples of sulfur-containing compounds include inorganic sulfides, organic sulfides, organic compounds containing nitrogen and sulfur, organic compounds containing oxygen and sulfur, and polymers containing sulfur.

10 Claims, 5 Drawing Sheets

(56) References Cited

OTHER PUBLICATIONS

Hou, Jiaai et al., "Effect of heavy metals on the stabilization of mercury(II) by DTCR in desulfurization solutions" Journal of Hazardous Materials (2012) 217-218: 224-230.

Kato, Takahiroet al., "Dynamic Behavior of Calcium and Mercury in Carbon Reduction of Gypsum" Journal of the Japan Institute of Energy (2013) 92(1): 157-163 (Abstract).

Kato, Takahiroet al., "Removal of mercury compounds from flue gas desulfurization gypsum" Sekitan Kagaku Kaigi Happyo Ronbunshu (2012) 49: 118-119 (Abstract).

Li, Li et al., "Characteristic of mercury release during FGD gypsum calcination" Shanghai Ligong Daxue Xuebao (2009) 31(4): 332-335. (Abstract).

Liu, Xueling et al., "Specialization of mercury in FGD gypsum and mercury emission during the wallboard production in China" Fuel (2013) 111: 621-627.

Marshall, Jessica et al., "Fate of Mercury in Synthetic Gypsum Used for Wallboard Production, Task 1" World of Coal Ash (WOCA) Conference (2005) 87: 1-27.

Sun, Mingyang et al., "Stabilization of mercury in flue gas desulfurization gypsum from coal-fired electric power plants with additives" Fuel Processing Technology (2012) 104: 160-166.

Sun, Mingyang et al., "The relationship between speciation and release ability of mercury in flue gas desulfurization (FGD) gypsum", Fuel (2014) 125: 66-72 (Abstract).

Thorwarth, Harald "Impact of Selected Parameters on the Behaviour of Mercury in Pulverised Coal-fired Power Stations" VGB Power Tech (2010) 90(11): 90-94.

\* cited by examiner

GYPSUM ADDITIVE TO CONTROL MERCURY

BACKGROUND

1. Field of the Invention

The present disclosure generally relates to additives and methods for controlling mercury. More particularly, the disclosure relates to sulfur-containing compounds useful as mercury control additives.

2. Description of the Related Art

The Environmental Protection Agency (EPA) recently published the Mercury and Air Toxics Rule (MATS Rule) that will require all electricity generating units (EGUs) that burn fossil fuels to reduce mercury emissions levels. Many of these units currently use, or will use, wet flue gas desulfurizers (wFGDs) to meet acid gas or SOx emission limits. A wFGD contacts combustion gas with an aqueous alkaline solution, which solution may be composed of magnesium compounds, sodium compounds, and slurries of lime or limestone to capture and neutralize acid gases, such as sulfur dioxide. The aqueous alkaline solution is commonly referred to as "wFGD liquor" or "scrubber liquor." In a forced oxidation system, oxygen may be introduced into the wFGD liquor to oxidize sulfite to sulfate. In many cases, this forms gypsum (calcium sulfate), as the final byproduct of scrubbing. Other systems may utilize inhibited or natural oxidation scrubbing which results in sulfite salts or mixed sulfite/sulfate salts as byproduct.

Mercury entering EGUs as a contaminant of the fuel is released during combustion. Combustion gases exiting the boiler may contain mercury in three forms: particulate, oxidized, and elemental. Particulate mercury can be captured by particulate control devices such as electrostatic precipitators (ESPs) and fabric filters (FF). Oxidized mercury is water-soluble so wFGDs can absorb the oxidized mercury from the combustion gas into the liquid phase. Elemental mercury, which is insoluble in water, is difficult to capture using existing air quality control devices. Consequently, mechanical methods, such as fixed bed catalysts (e.g., SCRs) and chemical additives (e.g., calcium bromide, hydrogen bromide, ammonium chloride) have been developed that oxidize elemental mercury in the gas phase for subsequent capture with a wFGD. The captured mercury leaves the process via wFGD blow down.

As oxidized mercury is water soluble, wFGDs are theoretically capable of capturing nearly 100% of the oxidized mercury in a combustion gas. However, data collected by the Department of Energy (DOE) as well as numerous laboratory and commercial studies have shown lower capture efficiencies. The lower efficiencies are the result of reduction of oxidized mercury to elemental mercury (e.g., $Hg^{2+}$ to $Hg^0$) within the wFGD scrubber liquor. For example, one reduction reaction involves the oxidation of sulfite by ionic mercury in the wFGD to provide sulfate and elemental mercury. The result is an increase across the wFGD of elemental mercury content in the scrubbed combustion gas, and thus a decrease in total mercury capture as measured from fossil fuel to stack. This reduction of oxidized mercury in the scrubber and subsequent release is known in the industry as mercury re-emission. The loss in wFGD mercury capture efficiency due to mercury re-emission will prevent some EGUs from meeting the MATS Rule, necessitating installation of additional equipment.

Mercury re-emission is currently addressed with the addition of certain additives. However, in addition to controlling mercury re-emission, there remains a need to treat the scrubbing byproduct, i.e., synthetic gypsum.

BRIEF SUMMARY

The present disclosure relates to additives for mercury control, methods of controlling mercury, and compositions comprising synthetic gypsum, mercury, and one or more of the additives described herein.

In one embodiment, a method of treating synthetic gypsum is disclosed. The method comprises transporting the synthetic gypsum from a wet flue gas desulfurizer and contacting the synthetic gypsum with an additive, the additive comprising a sulfur-containing compound.

In some embodiments, the sulfur-containing compound is selected from the group consisting of an inorganic sulfide, an organic sulfide, an organic compound comprising nitrogen and sulfur, an organic compound comprising oxygen and sulfur, a polymer comprising sulfur, and any combination thereof.

In some embodiments, the polymer comprising sulfur is modified to contain at least one of a sulfide and a dithiocarbamate salt group.

In some embodiments, the polymer comprising sulfur comprises about 5 mole % to about 100 mole % of dithiocarbamate salt groups.

In some embodiments, the organic sulfide is selected from the group consisting of 2,3-dimercaptopropanol, mercaptoacetic acid, trimercaptotriazine, and any combination thereof.

In some embodiments, the polymer comprising sulfur comprises the following structure:

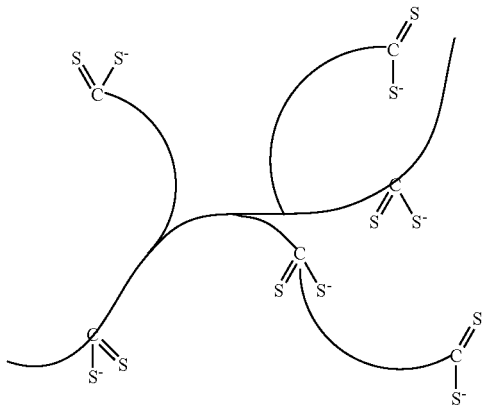

In some embodiments, the polymer comprising sulfur comprises a weight average molecular weight of about 500 g/mol to about 200,000 g/mol.

In some embodiments, the polymer comprising sulfur comprises at least an acrylic-x monomer and an alkylamine, wherein the acrylic-x monomer comprises the following generic structure:

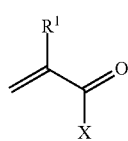

wherein X may be OR, OH, salts of OR, salts of OH, or NHR²; R¹ and R² are independently selected from H, an alkyl group, or an aryl group; and R is an alkyl group or an aryl group.

In some embodiments, the alkylamine comprises a member selected from the group consisting of an ethyleneamine, a polyethylenepolyamine, an ethylenediamine, a diethylenetriamine, a triethylenetetraamine, a tetraethylenepentamine, a pentaethylenehexamine, and any combination thereof.

In some embodiments, the acrylic-x monomer comprises a member selected from the group consisting of methyl acrylate, methyl methacrylate, ethyl acrylate, ethyl methacrylate, propyl acrylate, propyl methacrylate, acrylic acid, salts of acrylic acid, methacrylic acid, salts of methacrylic acid, acrylamide, methacrylamide, and any combination thereof.

In some embodiments, the molar ratio of the acrylic-x monomer to the alkylamine is from about 0.85 to about 1.5.

In some embodiments, the additive comprises a water-soluble ethylene dichloride ammonia polymer having a molecular weight from about 500 g/mol to about 10,000 g/mol and containing from about 5 to about 50 mole % of dithiocarbamate salt groups.

In some embodiments, the polymer comprising sulfur is formulated with a sulfide precipitant.

In some embodiments, the polymer comprising sulfur is formed by reacting glycidyl (meth)acrylate, allyl glycidyl ether or [(vinyloxy)methyl]oxirane with ammonia or a primary amine to form a first product, reacting the first product with one or more of acrylic acid, vinyl alcohol, vinyl acetate, acrylamide, methylacrylic acid, and methylacrylamide to form a second product, and reacting the second product with a dithiocarbamic acid salt.

In some embodiments, the synthetic gypsum comprises mercury and an amount of the additive contacting the synthetic gypsum is within a range of about 0.2 to about 2 moles of sulfur per mole of mercury.

In some embodiments, the additive comprises water.

In some embodiments, the synthetic gypsum is contacted by the additive in a conduit leading to a kiln.

In some embodiments, the additive comprises a compound selected from the group consisting of α-cyclodextrin, β-cyclodextrin, γ-cyclodextrin, a derivative of α-cyclodextrin, a derivative of β-cyclodextrin, a derivative of γ-cyclodextrin, a derivatives of cyclodextrin prepared by condensation of α-, β-, or γ-cyclodextrins with an epoxide, and any combination thereof.

In other embodiments of the present disclosure, a composition is disclosed. The composition comprises synthetic gypsum, mercury, and an additive, the additive comprising a sulfur-containing compound.

In some embodiments, the sulfur-containing compound comprises a polymer including at least an acrylic-x monomer and an alkylamine, wherein the acrylic-x monomer comprises the following generic structure:

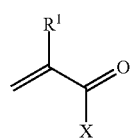

wherein X may be OR, OH, salts of OR, salts of OH, or NHR²;

R¹ and R² are independently selected from H, an alkyl group, or an aryl group; and R is an alkyl group or an aryl group.

In some embodiments, the polymer comprises at least one of a sulfide and a dithiocarbamate salt group.

In some embodiments, the alkylamine comprises a member selected from the group consisting of an ethyleneamine, a polyethylenepolyamine, an ethylenediamine, a diethylenetriamine, a triethylenetetraamine, a tetraethylenepentamine, a pentaethylenehexamine, and any combination thereof.

In some embodiments, the additive comprises a water-soluble ethylene dichloride ammonia polymer having a molecular weight from about 500 g/mol to about 10,000 g/mol and containing from about 5 to about 50 mole % of dithiocarbamate salt groups.

The present disclosure also provides the use of an additive for treating synthetic gypsum. The additive comprises a sulfur-containing compound and is added to the synthetic gypsum that has been transported from a wet flue gas desulfurizer.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
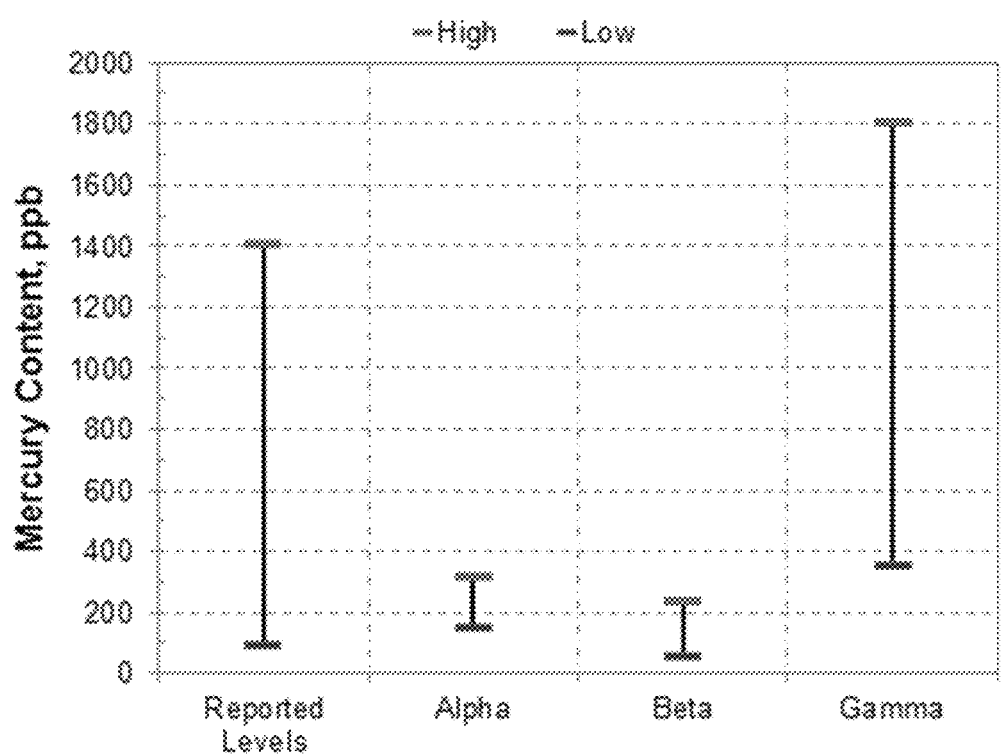
FIG. 1 shows a graph depicting ICP-MS mercury values for gypsum solids from three industrial sites (Alpha, Beta and Gamma) and reported literature values.

Various embodiments are described below. The relationship and functioning of the various components of the embodiments may better be understood by reference to the following detailed description. However, embodiments are not limited to those specifically described below.

Additives comprising sulfur-containing compounds are described below. Methods of treating synthetic gypsum with the additives are also disclosed. In addition, compositions comprising synthetic gypsum, mercury, and an additive are contemplated herein. When added to synthetic gypsum, the additive(s) serves to thermally stabilize heavy metals, such as mercury. This thermal stabilization reduces mercury release from the synthetic gypsum during processing into construction materials, such as wallboard. Moreover, the additive(s) facilitates lower overall mercury emissions from the process used to manufacture construction materials from synthetic gypsum.

The inventors studied how mercury control additives that were applied in the wFGD impacted downstream operations and byproducts. The byproduct of sulfur removal via wFGDs in the case of forced oxidation scrubbing is synthetic gypsum. Synthetic gypsum is used in the production of gypsum board and other commercial products. As a result of the study, it was unexpectedly discovered that the byproduct synthetic gypsum quality is enhanced as a result of the application of the presently disclosed additives comprising sulfur-containing compounds. This improvement makes the synthetic gypsum thus formed emit less mercury to the environment during subsequent processing, as compared to untreated synthetic gypsum, by stabilizing the mercury in the solid.

The presently disclosed additives comprise one or more sulfur-containing compounds. Illustrative, non-limiting examples of sulfur-containing compounds are selected from inorganic sulfides, organic sulfides, organic compounds containing nitrogen and sulfur, organic compounds containing oxygen and sulfur, and low molecular weight polymers containing sulfur. The presently disclosed additives may comprise one of these compounds or any combination of these compounds. Moreover, the additives may comprise water such that the sulfur-containing compounds are provided as aqueous solutions.

Inorganic sulfides include, but are not limited to, aqueous sulfide ions, such as NaHS. Additionally, a source of inorganic sulfides may include sulfidic waste water, kraft caustic liquor, kraft carbonate liquor, potassium sulfide, thioacetamide, sodium hydrosulfide, and potassium hydrosulfide. In some embodiments, the inorganic sulfides may be introduced to the synthetic gypsum as an aqueous sulfide species.

Organic sulfides include, but are not limited to, 2,3-dimercaptopropanol, mercaptoacetic acid, polythiocarbonate disodium salt, and trimercaptotriazine. Any organic sulfide known to control mercury may be used in accordance with the present disclosure.

The low molecular weight polymers useful in connection with the present disclosure contain sulfur. In some embodiments, such polymers may comprise weight-average molecular weights from about 500 g/mol to about 200,000 g/mol. In certain embodiments, the low molecular weight polymers comprise the following general structure:

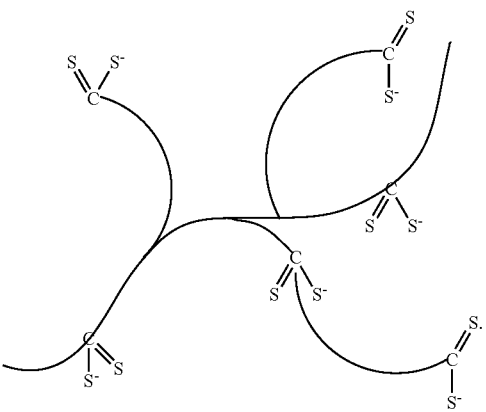

In some embodiments, the polymer is derived from at least two monomers: acrylic-x and an alkylamine, wherein the "acrylic-x" has the following formula:

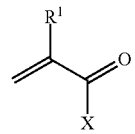

X may be OR, OH, or salts thereof. X may also be $NHR^2$, wherein $R^1$ and $R^2$ are independently selected from H, an alkyl group, or an aryl group (substituted or unsubstituted). R is an alkyl group or an aryl group (substituted or unsubstituted). In some embodiments, R is selected from the group consisting of H, $C_1$-$C_{16}$ alkyl, aryl, arylalkyl, $C_2$-$C_{16}$ alkenyl, $C_2$-$C_{16}$ alkynyl, heteroaryl, alkylheteroaryl, $C_3$-$C_8$ cycloalkyl. In some embodiments, R1 is selected from the group consisting of H, $C_1$-$C_{16}$ alkyl, aryl, arylalkyl, $C_2$-$C_{16}$ alkenyl, $C_2$-$C_{16}$ alkynyl, heteroaryl, alkylheteroaryl, $C_3$-$C_8$ cycloalkyl, and halogen. In some embodiments, R2 is selected from the group consisting of H, $C_1$-$C_{16}$ alkyl, aryl, arylalkyl, $C_2$-$C_{16}$ alkenyl, $C_2$-$C_{16}$ alkynyl, heteroaryl, alkylheteroaryl, and hydroxyl. The polymer is modified to contain at least one functional group capable of scavenging one or more compositions containing one or more metals, such as mercury.

The molecular weight of the polymers can vary. For example, the target species/application for the polymers can be one factor to take into consideration when determining an appropriate molecular weight. Another factor can be monomer selection. When molecular weight is mentioned in the present disclosure, it is referring to the weight average molecular weight of the unmodified polymer, otherwise referred to as the polymer backbone. The functional groups that are added to the backbone are not part of the calculation. Thus the molecular weight of the polymer with the functional groups can far exceed the molecular weight range given for the polymer backbone.

In one embodiment, the molecular weight of the polymer is from about 1,000 g/mol to about 16,000 g/mol. In another embodiment, the molecular weight of the polymer is from about 1,500 g/mol to about 8,000 g/mol.

Various functional groups can be utilized for mercury scavenging or scavenging of other metals in the synthetic gypsum. The polymer is modified to contain a functional group(s) that can bind metals. In one embodiment, the functional group contains a sulfide. In another embodiment, the functional group is a dithiocarbamate salt group. In one embodiment, the functional group comprises dimethyl dithiocarbamate.

The molar amounts of the functional group relative to the total amine contained in the unmodified polymer can vary. For example, the reaction of 3.0 molar equivalents of carbon disulfide to a 1.0:1.0 mole ratio acrylic acid/tetraethylenepentamine copolymer, which contains 4 molar equivalents of amine per repeat unit after polymerization, will result in a polymer that is modified to contain 75 mole % dithiocarbamate salt groups. In other words, 75% of the total amines in the unmodified polymer have been converted to dithiocarbamate salt groups.

In one embodiment, the polymer has between about 5 to about 100 mole % of dithiocarbamate salt groups. In a further embodiment, the polymer has from about 25 to about 90 mole % of dithiocarbamate salt groups. In yet a further embodiment, the polymer has from about 55 to about 80 mole % of dithiocarbamate salt groups.

Specific monomers for the polymer can be selected by one of ordinary skill in the art. The alkylamines may vary. In one embodiment, the alkylamine is at least one of the following: an ethyleneamine, a polyethylenepolyamine, ethylenediamine (EDA), diethylenetriamine (DETA), triethylenetetraamine (TETA), tetraethylenepentamine (TEPA), and pentaethylenehexamine (PEHA).

The acrylic-x monomer group can vary as well. In some embodiments, the acrylic-x is at least one of the following: methyl acrylate, methyl methacrylate, ethyl acrylate, and ethyl methacrylate, propyl acrylate, and propyl methacrylate. In other embodiments, the acrylic-x is at least one of the following: acrylic acid and salts thereof, methacrylic acid and salts thereof, acrylamide, and methacrylamide.

The molar ratio between monomers that make up the polymer, especially acrylic-x and alkylamine, can vary and depend upon the resultant polymer product that is desired. The molar ratio used is defined as the moles of acrylic-x divided by the moles of alkylamine. In one embodiment, the molar ratio between acrylic-x and alkylamine is from about 0.85 to about 1.5. In another embodiment, the molar ratio between acrylic-x and alkylamine is from about 1.0 to about 1.2.

Various combinations of acrylic-x and alkylamines are contemplated by the present disclosure, in addition to the associated molecular weight of the polymers. In one embodiment, the acrylic-x is an acrylic ester and the alkylamine is PEHA, TEPA, DETA, TETA, or EDA. In a further embodiment, the molar ratio between acrylic-x and alkylamine is from about 0.85 to about 1.5. In another embodiment, the molecular weight can encompass ranges from about 500 g/mol to about 200,000 g/mol, from about 1,000 g/mol to about 16,000 g/mol, or from about 1,500 g/mol to about 8,000 g/mol.

In certain embodiments, the acrylic ester can be at least one of the following: methyl acrylate, methyl methacrylate, ethyl acrylate, and ethyl methacrylate, propyl acrylate, and propyl methacrylate, which is combined with at least one of the alkylamines, which includes PEHA, TEPA, DETA, TETA, or EDA. In some embodiments, the resulting polymer is modified to contain the following ranges of dithiocarbamate salt groups: from about 5 to about 100 mole %, from about 25 to about 90 mole %, and from about 55 to about 80 mole %.

In another embodiment, the acrylic-x is an acrylic amide and the alkylamine is PEHA, TEPA, DETA, TETA, or EDA. In a further embodiment, the molar ratio between acrylic-x and alkylamine is from about 0.85 to about 1.5. The acrylic amide can be at least one or a combination of acrylamide and methacrylamide, which is combined with at least one of the following alkylamines: PEHA, TEPA, DETA, TETA, or EDA.

In another embodiment, the acrylic-x is an acrylic acid (or salt of acrylic acid) and the alkylamine is PEHA, TEPA, DETA, TETA, or EDA. In yet a further embodiment, the acrylic acid can be at least one or a combination of acrylic acid or salts thereof and methacrylic acid or salts thereof, which is combined with at least one of the following alkylamines: PEHA, TEPA, DETA, TETA, or EDA.

Other monomers can be integrated into the polymer backbone in addition to the constituent monomers, acrylic-x and alkylamine. A condensation polymer reaction scheme can be utilized to make the basic polymer backbone chain. Various other synthetic methods can be utilized to functionalize the polymer with, for example, dithiocarbamate and/or other known mercury scavenging functional groups. One of ordinary skill in the art can functionalize the polymer without undue experimentation.

Moreover, the low molecular weight polymer of the present disclosure can be formulated with other polymers, such as those disclosed in U.S. Pat. No. 5,164,095, which is incorporated herein by reference, which include a water soluble ethylene dichloride ammonia polymer having a molecular weight between 500 g/mol and 100,000 g/mol and contain from 5 to 50 mole % of dithiocarbamate salt groups. Also, the low molecular weight polymer can be formulated with other small molecule sulfide precipitants, such as sodium sulfide, sodium hydrosulfide, TMT-15® (sodium or calcium salts of trimercapto-s-triazine; Evonik Industries Corporation 17211 Camberwell Green Lane, Houston, Tex. 77070, USA), dimethyldithiocarbamate, and/or diethyldithiocarbamate.

In certain embodiments, the low molecular weight polymer of the present disclosure comprises a water-soluble ethylene dichloride ammonia polymer having a molecular weight from about 500 g/mol to about 10,000 g/mol and containing from about 5 to about 50 mole % of dithiocarbamate salt groups. The salts include, but are not limited to, alkaline and alkali earth metals, such as sodium, lithium, potassium, or calcium.

In still further embodiments the sulfur-containing compounds may be one or more polymers obtained by: 1) reacting glycidyl (meth)acrylate, allyl glycidyl ether, or [(vinyloxy)methyl]oxirane with ammonia or a primary amine to form a first product, 2) reacting the first product with one or more of acrylic acid, vinyl alcohol, vinyl acetate, acrylamide, methylacrylic acid, and methylacrylamide to form a second product, and 3) reacting the second product with a dithiocarbamic acid salt.

One or more of the sulfur-containing compounds may comprise any of the following general structural formulas I, II, and III:

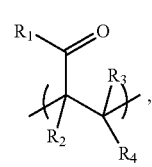

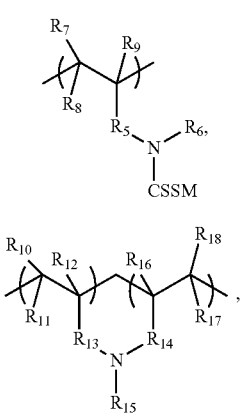

wherein $R_1$ is —OM or —NH$_2$; $R_2$, $R_9$, $R_{12}$, and $R_{16}$ are independently hydrogen, or a methyl group; $R_3$, $R_4$, $R_7$, $R_8$, $R_{10}$, $R_{11}$, $R_{17}$, and $R_{18}$ are independently hydrogen, a methyl group, or —COOH; $R_5$, $R_{13}$, and $R_{14}$ are independently selected from:

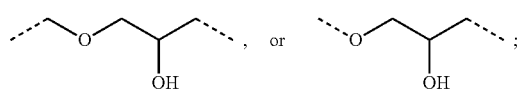

$R_6$ is H,

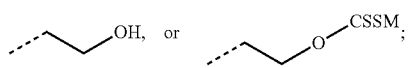

$R_{15}$ is —CSSM,

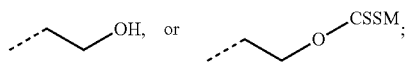

and M is monovalent cation.

The additive described herein may comprise one or more sulfur-containing compounds disclosed in U.S. Pat. No. 8,632,742, the disclosure of which is incorporated by reference into the present application.

Additionally, the presently disclosed additive may comprise one or more cyclodextrin compounds, such as α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof. The additive may comprise any cyclodextrin compound, such as those disclosed in U.S. Pat. No. 9,120,055, the disclosure of which is incorporated by reference into the present application.

The amount of the additive comprising one or more sulfur-containing compounds to be added to the synthetic gypsum can vary widely. In some embodiments, the amount to be added depends upon the amount of mercury in the synthetic gypsum. The calculation of dosage amounts can be done without undue experimentation.

In one embodiment, the amount of the additive comprising sulfur-containing compounds added to the synthetic gypsum is within the range of about 0.2 to about 2 moles of sulfur per mole of mercury. In some embodiments, the additive is applied at a ratio of about 1:1 to about 2000:1, by weight, of the additive to the weight of mercury being captured from the synthetic gypsum. Exemplary ratios include from about 5:1 to about 1000:1 and from about 5:1 to about 500:1.

The present disclosure contemplates adding the additive comprising sulfur-containing compounds directly to synthetic gypsum. For example, a wFGD includes a solid waste side, where the synthetic gypsum byproduct exits the wFGD. The additive comprising the sulfur-containing compound can be added to the synthetic gypsum at this location. In some embodiments, the additive is only added to the synthetic gypsum after (and not before) it exits a wFGD. Additionally, gypsum plants, which make construction materials, generally include conduits comprising streams of synthetic gypsum used to form the construction materials. The streams may comprise from about 1% to about 100% synthetic gypsum. One or more of the conduits may feed into a kiln. The presently disclosed additives can be added to the gypsum stream in a conduit.

In general, the presently disclosed additives comprising sulfur-containing compounds can be added to the synthetic gypsum at any time after the gypsum exits the wFGD, such as during a gypsum manufacturing process. As such, while the prior art may seek to control mercury emission at power plants, aspects of the present disclosure can be used to control mercury emission at gypsum plants. While developing the presently disclosed technology, the inventors unexpectedly discovered that mercury is not released from the synthetic gypsum at temperatures up to about 190° C. because the mercury is stabilized by the presently disclosed additives after they are added to the synthetic gypsum.

EXAMPLES

Various additives were tested by the inventors to prove the inventive concept of the present application. For example, some of the tested additives comprised various polymers. Some of the polymers were derived from at least two monomers: acrylic-x and an alkylamine. Some of the polymers were modified to contain a particular functional group. In some of the additives, the molar ratio between acrylic-x and alkylamine was from about 0.85 to about 1.5. In some of the additives, the alkylamine was selected from an ethyleneamine, a polyethylenepolyamine, ethylenediamine (EDA), diethylenetriamine (DETA), triethylenetetraamine (TETA), tetraethylenepetamine (TEPA), pentaethylenehexamine (PEHA), and any combination thereof. In some of the additives, the acrylic-x was selected from methyl acrylate, methyl methacrylate, ethyl acrylate, ethyl methacrylate, propyl acrylate, propyl methacrylate, and any combination thereof. In some of the additives, the functional group comprised a sulfide containing chemistry and in other additives, the functional group comprised a dithiocarbamate salt group.

In some experiments, the inventors tested a polymer additive wherein the acrylic-x comprised acrylic acid, the alkylamine comprised TEPA, and the ratio of acrylic-x:alkylamine was 1.0. The average weight molecular weight of the polymer backbone (Poly(Acrylic Acid/TEPA) relative to measurement used was about 5,000 Daltons. The polymer included a dithiocarbamate functional group (reaction of polymer backbone with carbon disulfide and caustic) reacted to about 70 mole % of the total amine in the polymer backbone. The average weight molecular weight of modified polymer backbone (70 mole % carbon disulfide-modified-Poly(Acrylic Acid/TEPA)) cannot be measured due to method/equipment limitations but it was estimated to be about 10,700 Daltons. In the experiments described below, this particular additive is referred to as "sulfur-containing scrubber additive."

Gypsum samples were taken from different coal-fired power plant wFGD slurry systems both before addition of a sulfur-containing scrubber additive and during application of sulfur-containing scrubber additive where the plants were within MATS compliance. Samples were then analyzed by thermal dissociation of mercury from the sample and then analyzed by a specialized elemental mercury spectrometer. The temperatures analyzed during thermal dissociation were about 125, about 190, about 350 and about 680° C. Samples were also analyzed by inductively coupled plasma-mass spectrometry (ICP-MS) to determine total mercury content in the gypsum and scanning electron microscopy (SEM) for morphology changes. Subsequently, a toxicity characteristic leaching procedure (TCLP) was carried out to determine if the samples would leach toxic materials in a landfill. Three different commercial units were sampled; their general configurations can be seen in Table 1.

TABLE 1

General configurations of the power generation units for the WFGD scrubber slurry samples analyzed.

| Unit | Coal | SCR | AQCDs | Fines |
|---|---|---|---|---|
| Alpha | Bituminous | Yes | FF, LSFO | Hydroclones |
| Beta | Bituminous | No | ESP(H); LSFO | Hydroclones |
| Gamma | Bituminous | Yes | ESP(H); LSFO | Hydroclones |

AQCDs—air quality control devices, FF—fabric filter, LSFO—limestone scrubber with forced air oxidation, ESP—electrostatic precipitator.

Mercury content in the gypsum samples was compared to reported literature values from other commercial sources. The reported mercury levels in the samples compared well to those from the three commercial sites using ICP-MS (FIG. 1). Application of a sulfur-containing scrubber additive did not increase the mercury content levels. All mercury levels in the gypsum samples were typical of those seen in gypsum from other coal-fired power plants.

Figure 2:
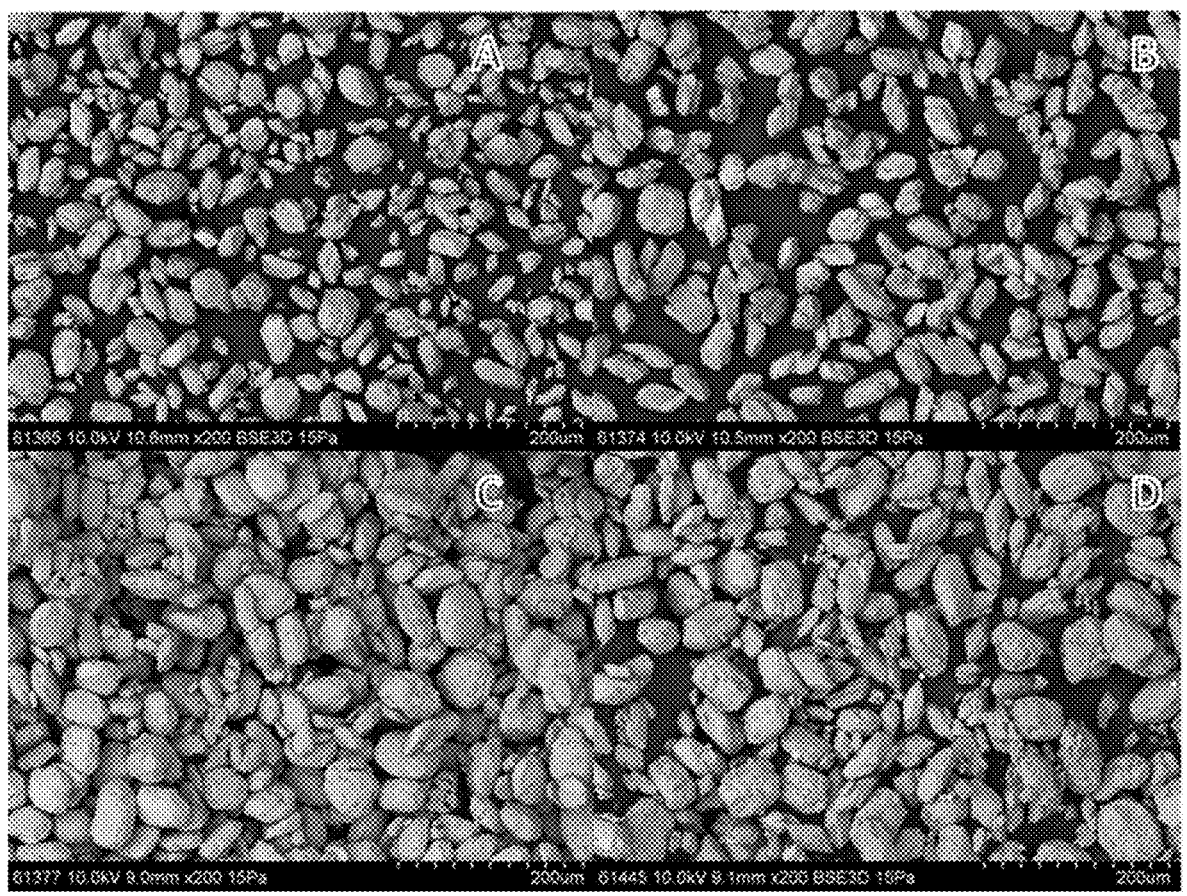
FIG. 2 depicts SEM micrographs of Beta site gypsum samples before (A) and during (B) sulfur-containing scrubber additive application and Gamma site gypsum samples before (C) and during (D) sulfur-containing scrubber additive application.

The morphology and size of the gypsum particles was also not changed by the application of a sulfur-containing scrubber additive while both the Beta and Gamma units were within MATS compliance, as seen in the SEM micrographs in FIG. 2.

TCLP testing of both the Beta and Gamma sites' gypsum, before and during sulfur-containing scrubber additive addition, found no change in the mercury leaching and all samples were below the RCRA limit of 200,000 ppt (Table 2).

TABLE 2

TCLP data for mercury leaching in gypsum samples.

| System | Condition | Average (ppt) | StdDev | % RSD |
|---|---|---|---|---|
| Beta Site | Pre-Compliance | 10.3 | 4.03 | 39.1 |
|  | MATS Compliance | 11.5 | 5.50 | 47.9 |
| Gamma Site | Pre-Compliance | 21.7 | 8.98 | 41.3 |
|  | MATS Compliance | 27.0 | 9.42 | 34.9 |

Pre-compliance = before sulfur-containing scrubber additive addition.
MATS compliance = during sulfur-containing scrubber additive addition.

The amount of the additive that was used in the tests was not precisely known. These gypsum samples were taken from commercial units using the inventor's technology to meet MATS compliance. The dosage is automatically fed based on a number of factors, including ORP and megawatt load of the unit (based on, for example, U.S. Pat. No. 8,632,742, which is incorporated by reference into the present application in its entirety). The gypsum taken from these plants is the same gypsum sold to wallboard manufacturers so this is a real world application and test of the technology.

Figure 3A:
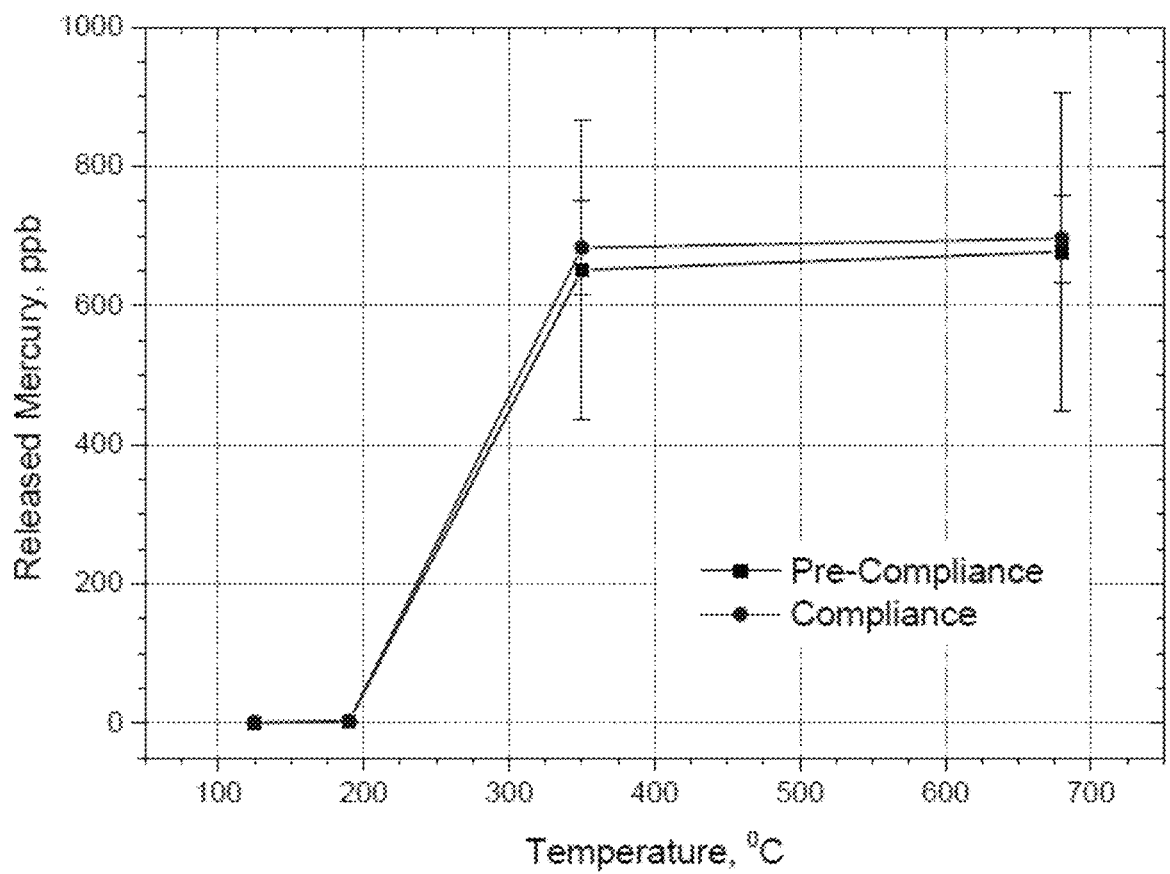
FIGS. 3A and 3B show graphs depicting mercury dissociation (release) from Beta (FIG. 3A) and Gamma (FIG. 3B) site gypsum samples at varying temperature. "Pre-compliance" means before sulfur-containing scrubber additive addition and "compliance" means during sulfur-containing scrubber additive addition. "Low ORP" is <300 mV and "High ORP" is >300 mV.
Figure 3B:
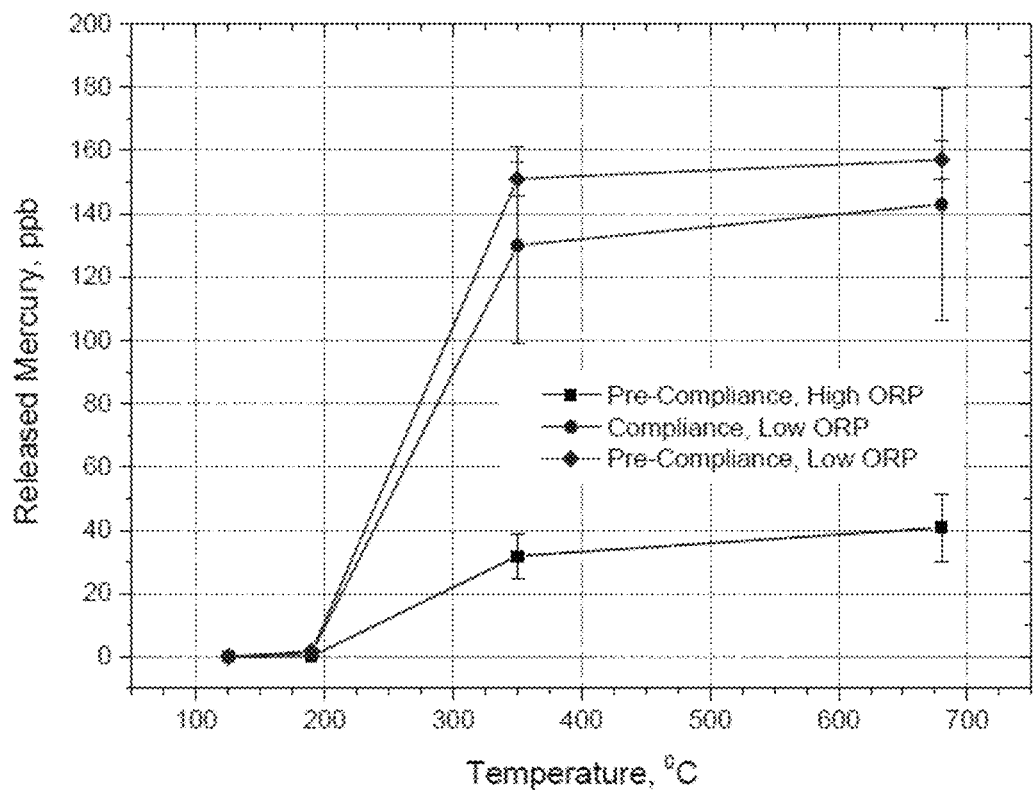
Figure 4:
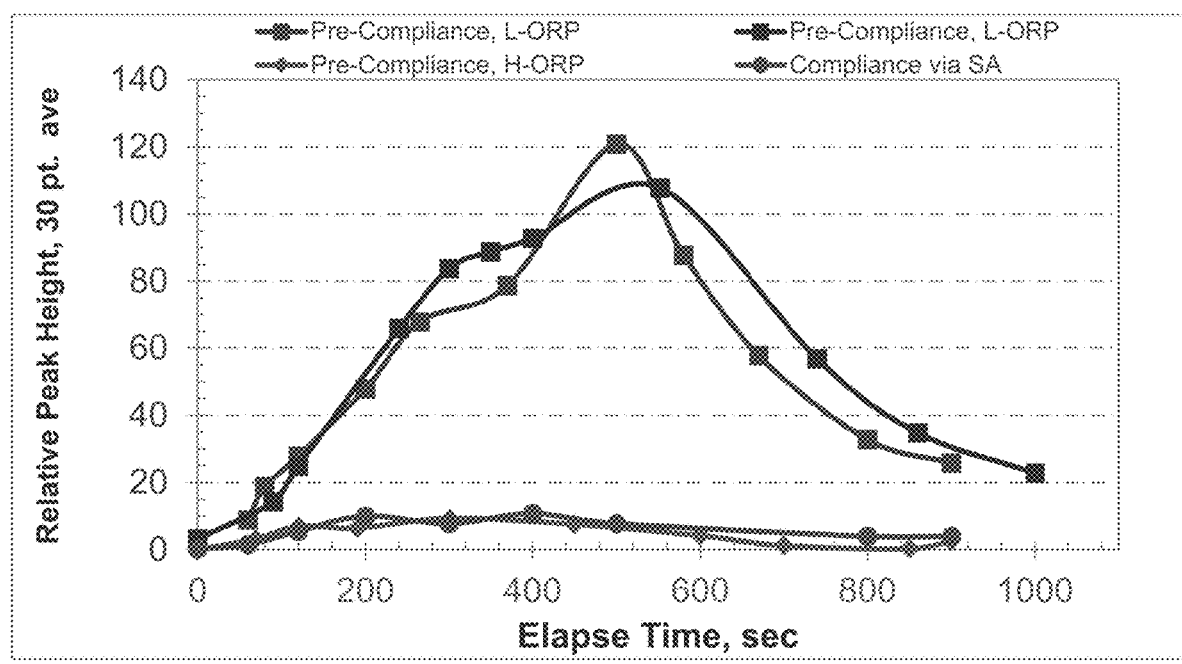
FIG. 4 shows a graph depicting mercury dissociation over time at about 190° C. for the beta site gypsum sample.

Typical wallboard manufacturing employing gypsum has a maximum temp of 166° C. for a 15 minute dwell. During the thermal dissociation of mercury from the gypsum analysis, a temperature of about 190° C. was used to encompass all process steps during a typical wall board production. In FIGS. 3A and 3B, both Beta and Gamma site gypsum was analyzed for mercury dissociation. The Beta and Gamma site gypsum samples show no change in mercury dissociation at about 190° C. and lower. During gypsum processing there should be no change. An interesting trend was seen with oxidative reduction potential (ORP) at higher temperatures. As ORP decreases, more mercury is typically found in the solid phase in a wFGD scrubber slurry. In FIG. 4, the mercury dissociation from the beta site gypsum can be seen for a number of samples at about 190° C. From these plots we can determine that at about 190° C. and lower, a sulfur-containing scrubber additive increases the stability of mercury in gypsum and increases the temperature at which mercury will dissociate from the gypsum.

Any composition (or additive) disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the compositions and methods disclosed and claimed herein can be made and executed without undue experimentation in light of the present disclosure. While this invention may be embodied in many different forms, specific preferred embodiments of the invention are described herein. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of treating synthetic gypsum, comprising:
    transporting the synthetic gypsum from a wet flue gas desulfurizer; and
    contacting the synthetic gypsum with an additive, the additive comprising a sulfur-containing compound and water, wherein the sulfur-containing compound is a polymer comprising sulfur that is modified to contain at least one of a sulfide and a dithiocarbamate salt group.

2. The method of claim 1, wherein the polymer comprising sulfur comprises about 5 mole % to about 100 mole % of dithiocarbamate salt groups.

3. The method of claim 1, wherein the polymer comprising sulfur comprises the following structure:

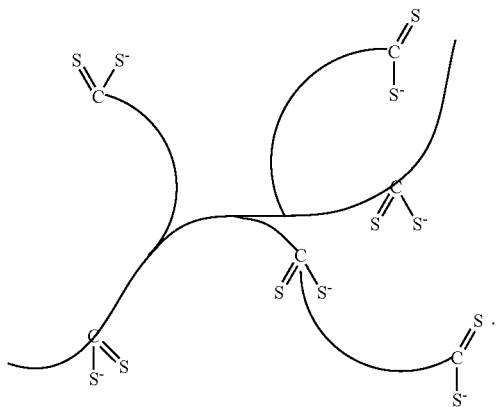

4. The method of claim 1, wherein the polymer comprising sulfur is formulated with a sulfide precipitant.

5. The method of claim 1, wherein the polymer comprising sulfur is formed by reacting glycidyl (meth)acrylate, allyl glycidyl ether or [(vinyloxy)methyl]oxirane with ammonia or a primary amine to form a first product, reacting the first product with one or more of acrylic acid, vinyl alcohol, vinyl acetate, acrylamide, methylacrylic acid, and methylacrylamide to form a second product, and reacting the second product with a dithiocarbamic acid salt.

6. The method of claim 1, wherein the synthetic gypsum is contacted by the additive in a conduit leading to a kiln.

7. A method of treating synthetic gypsum, comprising:
    transporting the synthetic gypsum from a wet flue gas desulfurizer; and
    contacting the synthetic gypsum with an additive, the additive comprising a sulfur-containing compound, wherein the sulfur-containing compound is a polymer comprising sulfur that comprises a weight average molecular weight of about 500 g/mol to about 200,000 g/mol.

8. A composition comprising synthetic gypsum, mercury, and an additive, the additive comprising a sulfur-containing compound, wherein the sulfur-containing compound comprises a polymer including at least an acrylic-x monomer and an alkylamine, wherein the acrylic-x monomer comprises the following generic structure:

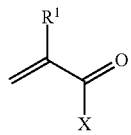

wherein X may be OR, OH, salts of OR, salts of OH, or NHR²;
R¹ and R² are independently selected from H, an alkyl group, or an aryl group; and R is an alkyl group or an aryl group.

9. The composition of claim 8, wherein the polymer comprises at least one of a sulfide and a dithiocarbamate salt group.

10. The composition of claim 8, wherein the alkylamine comprises a member selected from the group consisting of an ethyleneamine, a polyethylenepolyamine, an ethylenediamine, a diethylenetriamine, a triethylenetetraamine, a tetraethylenepentamine, a pentaethylenehexamine, and any combination thereof.

* * * * *